United States Patent
Wells et al.

(10) Patent No.: US 8,751,040 B2
(45) Date of Patent: Jun. 10, 2014

(54) SYSTEMS AND METHODS FOR EVALUATING BRAKING PERFORMANCE

(75) Inventors: James W. Wells, Rochester Hills, MI (US); Gary Lee Snavely, Milford, MI (US); Roland J. Menassa, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 755 days.

(21) Appl. No.: 12/753,579

(22) Filed: Apr. 2, 2010

(65) Prior Publication Data

US 2011/0245970 A1     Oct. 6, 2011

(51) Int. Cl.
*G06F 19/00*     (2011.01)

(52) U.S. Cl.
USPC ........................................................ 700/245

(58) Field of Classification Search
USPC ........................................................ 700/245
See application file for complete search history.

(56) References Cited

U.S. PATENT DOCUMENTS

| | | | |
|---|---|---|---|
| 2007/0265731 A1* | 11/2007 | Merk et al. | 700/245 |
| 2008/0103362 A1* | 5/2008 | Couvillon, Jr. | 600/148 |
| 2010/0058850 A1* | 3/2010 | Ortmaier et al. | 73/121 |
| 2010/0070077 A1* | 3/2010 | Le | 700/254 |

* cited by examiner

*Primary Examiner* — Khoi Tran
*Assistant Examiner* — Harry Oh
(74) *Attorney, Agent, or Firm* — Parks IP Law LLC; Stephen J. Terrell

(57) ABSTRACT

A system is configured to determine the performance of a braking system for a joint of a robot. The braking system is configured to apply a brake to the joint and a servo system is configured to apply a torque to the joint. The system measures performance data at the joint, identifies a performance parameter, and defines performance regions and limits that are used to evaluate the performance parameter.

18 Claims, 3 Drawing Sheets

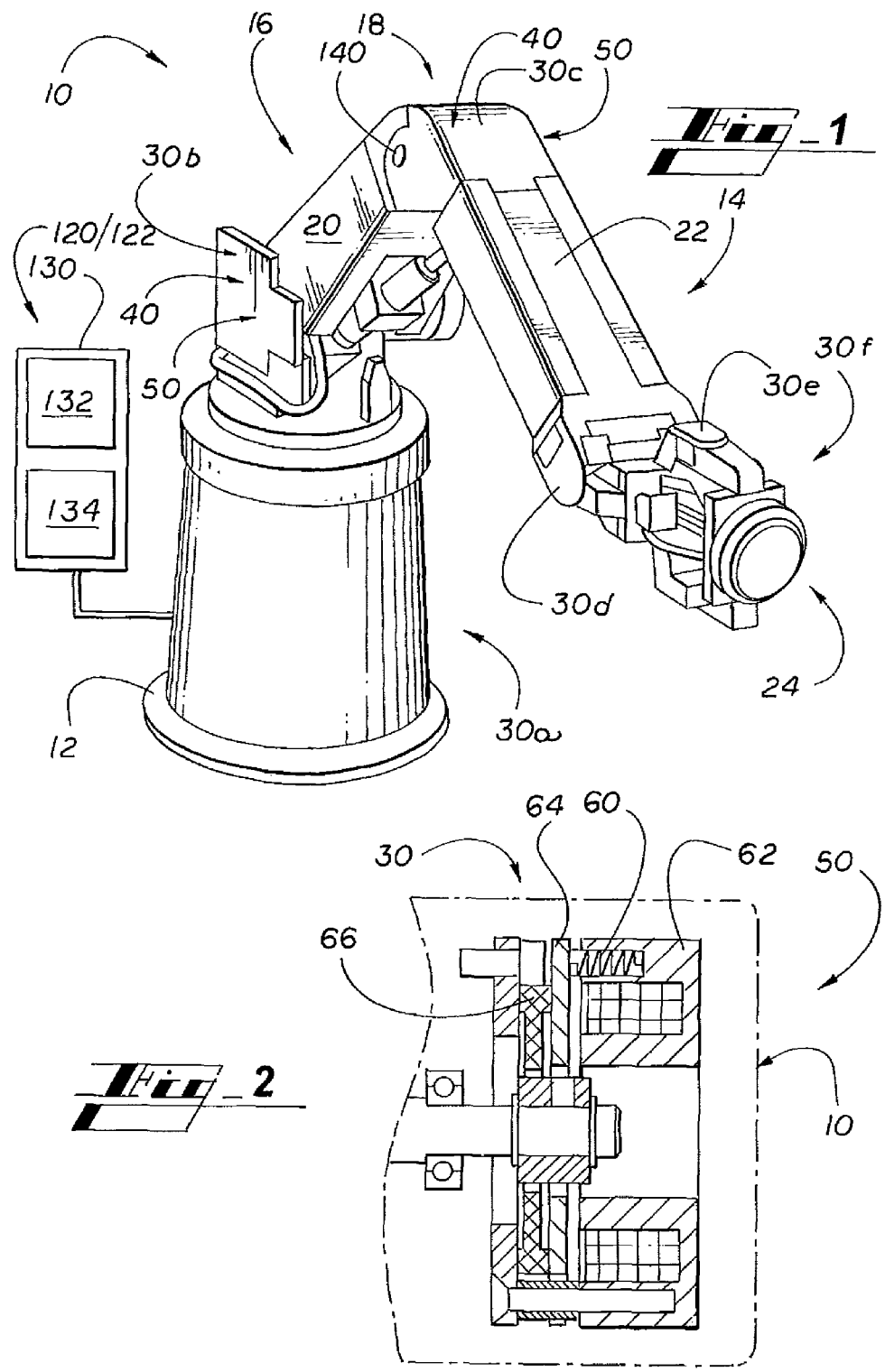

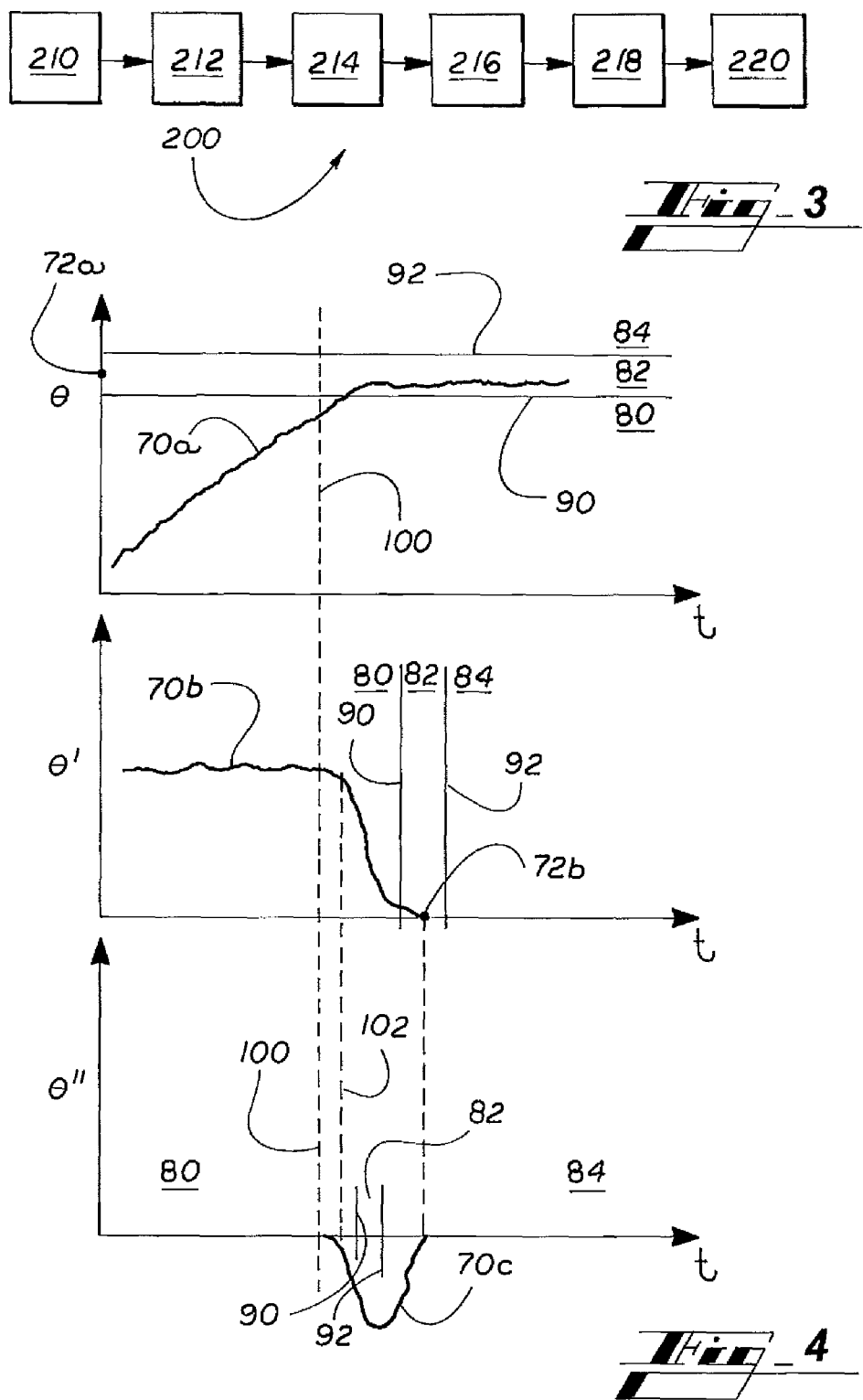

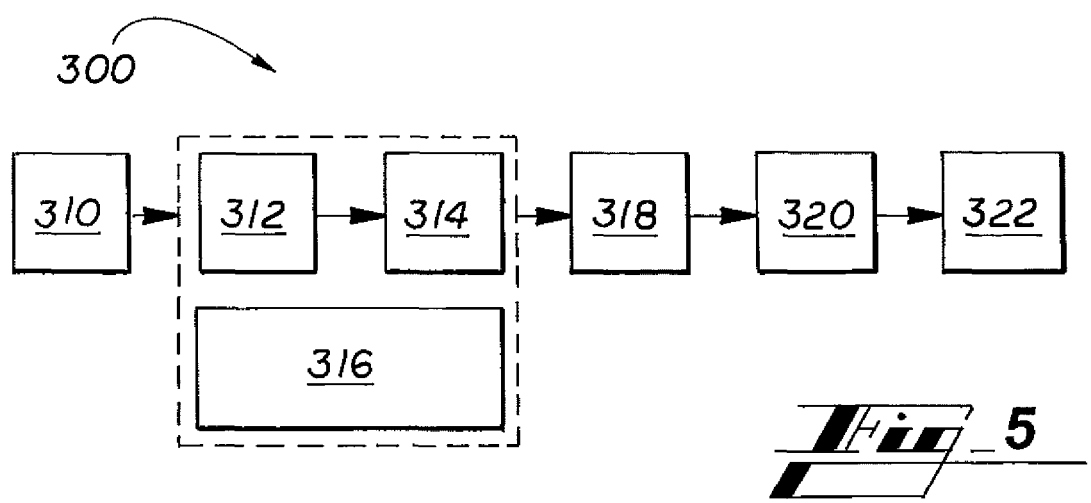
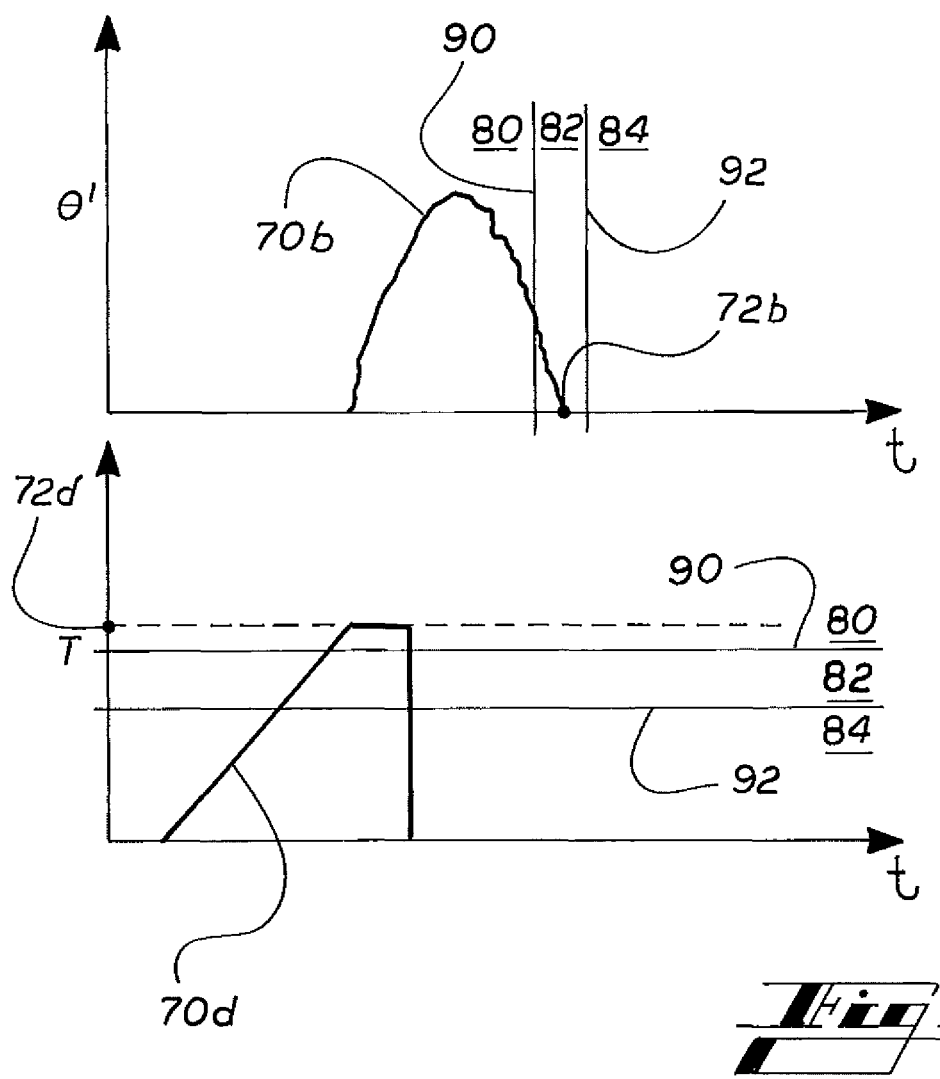

SYSTEMS AND METHODS FOR EVALUATING BRAKING PERFORMANCE

TECHNICAL FIELD

This disclosure relates generally to industrial automation, and more specifically to systems and methods for evaluating braking performance of robots.

BACKGROUND

Wear or contamination of brakes results in braking failure or unsafe operation of a robot. Braking failure results in poor stopping performance during an emergency stop (e-stop), inability of the robot to hold a desired position, and inability of the robot to stay within its restricted space in a workcell layout. For purposes of maintaining safety and minimizing downtime, it is important to recognize the degradation of electromechanical brakes, electrical dynamic braking capability, and overall braking performance.

SUMMARY

The various embodiments provide systems and methods for evaluating braking performance. The exemplary systems and methods are configured to identify when brakes need to be serviced, replaced, or closely monitored.

According to an exemplary embodiment, a system for determining the performance of a braking system for a joint of a robot during an emergency stop includes a processor and a memory. The memory includes computer executable instructions that, when executed by the processor, cause the processor to identify a performance parameter from the performance data that is measured with a sensor at the joint of the robot; define a limit as a function of an expected value of the performance parameter; and determine if the performance parameter exceeds the limit. The expected value is a function of the dynamics of the robot at the emergency stop.

According to another exemplary embodiment, a system for determining the performance of a braking system for a joint of a robot includes a processor and a memory. The memory includes computer executable instructions that, when executed by the processor, cause the processor to simultaneously apply a brake to the joint and increase the torque to the joint until the torque overcomes the brake; collect performance data measured by a sensor at the joint of the robot; identify a performance parameter from performance data; define a plurality of performance regions; and determine, from the plurality of performance regions, the performance region in which the performance parameter falls. The performance region corresponds to the performance of the braking system.

According to another exemplary embodiment, a robot includes an arm including a joint, a braking system configured to apply a brake at the joint, a servo system configured to apply a torque at the joint, a sensor configured to measure performance data at the joint; and a system for determining the performance of the braking system. The performance system includes a processor and a memory. The memory includes computer executable instructions that, when executed by the processor, cause the processor to identify a performance parameter from the performance data measured by the sensor; define performance regions as a function of an expected value of the performance parameter; and determine, from the performance regions, the performance region in which the performance parameter falls.

The foregoing has broadly outlined some of the aspects and features of the present disclosure, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is perspective view of a robot according to an exemplary embodiment.

FIG. 2 is a cross sectional view of a brake at a joint of the robot of FIG.

FIG. 3 is a flow chart illustrating an e-stop method according to an exemplary embodiment.

FIG. 4 is a graphical illustration of performance data associated with a joint of the robot of FIG. 1 and with the e-stop method of FIG. 3.

FIG. 5 is a flow chart illustrating a breakaway method according to an exemplary embodiment.

FIG. 6 is a graphical illustration of performance data associated with a joint of the robot of FIG. 1 and with the breakaway method of FIG. 5.

DETAILED DESCRIPTION

As required, detailed embodiments are disclosed herein. It must be understood that the disclosed embodiments are merely exemplary of various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

Although exemplary embodiments are described herein in the context of a robot used in automated manufacturing, the teachings are applicable in other environments including conveyors, machine tools, automated vehicles, and other applications using servo axes and braking systems. The embodiments of the disclosure include techniques and algorithms that robustly and automatically evaluate the condition and performance of a braking system of a robot.

Robot

Referring to FIG. 1, a robot 10 includes a base 12, an arm 14, a servo system 16, a braking system 18, a monitoring system 120 and a control system 122. In general, robots have an associated maximum space, restricted space, and operating space in which an arm operates. As used herein, the term "arm" is used generally to refer to an articulate structure with one or more joints or axes. Those skilled in the art will appreciate that joints or axes may be, for example, revolute, rectilinear, rotary, prismatic, axial, combinations thereof, and the like.

Continuing with FIG. 1, the illustrated arm 14 extends from the base 12 and includes a proximal extension 20, a distal extension 22, and an end effector 24. The robot 10 includes a plurality of joints 30 that dynamically connect the elements of the robot 10 to one another. The base includes an arm sweep joint 30a, the proximal end of the proximal extension 20 is connected to the base 12 by a shoulder swivel joint 30b, the distal end of the proximal extension 20 is connected to the proximal end of the distal extension 22 by an elbow joint 30c, and the end effector 24 is connected to the distal end of the distal extension 22 by a pitch joint 30d, a yaw joint 30e, and a roll joint 30f.

The servo system 16 includes a servomotor 40 at each joint 30. Each servomotor 40 is configured to apply a torque to the respective joint 30. Torque is applied to move and position the robot 10 according to commands from the control system 122. The control system 122 determines the torque profile input to each of the servomotors 40 according to processes, tasks, tests, moves, and motions to be performed by the robot 10. The elements of the control system 122 are described in further detail below.

The braking system 18 includes two braking subsystems. The electromechanical subsystem includes a brake 50 configured to apply friction at each joint 30. Friction is applied to make the robot 10 come to a stop, for example, during an emergency stop (e-stop). The electromechanical subsystem is configured to maintain the position of the robot 10 where the servo system 16 ceases to do so.

Referring to FIG. 2, each illustrated brake 50 is an electromagnetic axis brake that includes a spring 60, a coil 62, an armature plate 64, and a friction plate 66. Each brake 50 is deactivated as the control system 122 supplies power to the coil 62. The powered coil 62 pulls plates 64, 66 apart. Each brake 50 is activated as control system 122 removes power from the coil 62. When the coil 62 is not powered, spring 60 presses armature plate 64 against friction plate 66 to activate brake 50.

The dynamic braking subsystem 122/16 is integrated into the control system 122 and the servo system 16. The control system 122 is configured to use current that is generated at the servomotors 40 to assist in retarding motion at higher axis speeds. For example, during an e-stop, the control system 122 removes power from the servomotor 40. Windings of the servomotor 40 are electrically connected to one another and the back-EMF (voltage internally generated by the servomotor's 40 motion) develops a current that retards the motion of the servomotor 40. Generally, the dynamic braking resistance to motion is more effective at higher speeds where larger currents can be generated and is less effective at low speeds or when the servomotor 40 is nearly stopped and smaller currents are generated.

Monitoring System and Control System

Although the monitoring system 120 and the control system 122 are described as separate units for purposes of teaching, it should be understood that the functions of the systems 120, 122 can be performed by a single unit or by different units. The systems 120, 122 include a computer 130 with a processor 132 and memory 134 or computer readable media that stores computer executable instructions. While the methods described herein may, at times, be described in a general context of computer-executable instructions, the methods of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, handheld computing devices, mobile devices, microprocessor-based, programmable consumer electronics, combinations thereof, and the like.

Computer readable media includes, for example, volatile media, non-volatile media, removable media, and non-removable media. The term computer-readable media and variants thereof, as used in the specification and claims, refer to storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY®, or other optical disk storage, magnetic tape, magnetic disk storage or other magnetic storage devices.

The control system 122 is configured to control the servo system 16 and the braking system 18. Instructions for controlling the servo system 16 to move and position the robot 10 are stored in memory 134. The instructions include torque profiles to for each servomotor 40 to accomplish movements. The torque applied by each servomotor 40 is a part of a dynamic model of the robot 10. For example, the dynamic model can include the sum of moments at each joint 30. The dynamic model also includes the gravity loads and inertial loads that are due to the structural mass of the robot 10, the end effector 24, and any payload mass. For example, payload mass is an object that is grasped by the robot 10. The gravity loads and inertial loads are dependent on the position and movement of the robot 10 at any particular time. For example, the position and movement of the robot 10 can be characterized by the instantaneous position and movement of the joints 30.

The torque profiles for accomplishing a predetermined motion with the robot 10 are generated with the dynamic model. For example, given the loads on robot 10, the initial position, and the prescribed motion, the torque profiles for the servomotors 40 to achieve the prescribed motion are generated. To check the nominal operation and motion progress of the robot 10, the generated torque profiles are compared to servomotor 40 torque measurements during the prescribed motion.

The monitoring system 120 is configured to evaluate the performance of the braking system 18 according to testing methods 200, 300 described in further detail below. In general, the monitoring system 120 measures performance data 70 and identifies performance parameters 72 that represent the performance of the braking system 18. The monitoring system 120 determines the performance based on a performance region 80, 82, 84 where the performance parameter 72 falls.

For purposes of teaching, the illustrated performance data 70 and performance parameters 72 are associated with the joints 30. It should be understood that systems and methods can similarly be applied to other elements of the robot. To measure performance data 70 at the joints 30, the monitoring system 120 includes sensors 140 such as encoders, position feedback devices, current sensing devices, and the like. The illustrated sensors 140 are configured to measure the rotational position $\theta$ of the joint 30, the rotational speed $\theta'$ of the joint, the rotational acceleration $\theta''$ of the joint 30, and the torque T of the servomotor 40. Other sensors and performance parameters may be used.

During the e-stop method 200, the monitoring system 120 monitors performance parameters 72 including resting position 72a, stopping time 72b, and engagement time 72c. During breakaway method 300, monitoring system 120 monitors performance parameters including stopping time 72b and breakaway torque 72d. These performance parameters 72 are described in further detail below. Other performance parameters that represent the performance of the braking system 18 include deceleration rate and the like.

Referring to FIGS. 4 and 6, the performance regions 80, 82, 84 described herein include good region 80, warning region 82, and fail region 84. Adjacent performance regions 80, 82, 84 are dynamically defined by limits 90, 92 or thresholds. The performance regions 80, 82, 84 and limits 90, 92 are generally correspond to the motion of the robot 10 that is to be stopped and are adjusted based on the motion of the robot 10. For example, expected values of a performance parameter 72 that are determined for different robot 10 motions are used to set the limits 90, 92 for different robot 10 motions. The expected values are determined in real time or beforehand using the dynamic model or are experimentally determined beforehand. In any event, factors including motion, configuration, and payload of the robot 10 when the braking system 18 is applied are taken into account to determine the expected values. The expected values are also associated with a braking system 18 with known frictional capabilities or known performance. Generally, the expected values calibrate the braking system 18 for good performance.

In some embodiments, the monitoring system 120 determines an expected value and determines the limits 90, 92 as a function of the expected value. For example, the limits 90, 92 can be defined as a percentage of the expected value. Similarly, the limits 90, 92 can be the expected value plus an unacceptable level of error. The limits 90, 92 can be selected such that the warning region 82 does not to prematurely warn of impending failure and to allow an ample period of automatic operation so that the robot 10 can function normally until the next scheduled service interval, thus avoiding any unscheduled downtime.

To determine the limits 90, 92 or performance regions 80, 82, 84 experimentally, the value of a performance parameter 72 for a good-performing braking system 18 is determined for a sample range of robot 10 motions. The resulting range of performance parameter 72 values can be extrapolated to generate a range of performance parameters 72 from which limits 90, 92 can be determined for any robot 10 motion. Here, the limits 90, 92 and performance regions 80, 82, 84 are a function of the experimentally determined performance parameter 72 values.

The monitoring system 120 is further configured to generate an alert that indicates impending failure when the performance parameter 72 falls in the warning region 82 and to instruct the control system 122 to fail to safe when performance parameter 72 falls in the fail region 84. For example, fail to safe instructions include those that move the robot 10 to a position that minimizes damage and risk. The alert includes a message displayed on a human-machine interface (HMI) (not shown) that indicates that preventative maintenance will be required soon for particular joints 30 that are associated with the alert. In some embodiments, operation of the robot 10 can continue after the alert is issued. If control system 122 fails to safe, in certain embodiments, further automatic operation of the robot 10 by the control system 122 is stopped until maintenance is performed. The monitoring system 120 is further configured to log the performance data 70 that corresponds to each e-stop method 200 and breakaway method 300. The performance data 70 is logged with the time, date, and joint 30 in the memory 134.

Performance data 70 for certain joints 30 can be updated more frequently than others. For example, for certain robot motions or modes of operation, the speed at one joint 30 is faster than the speed at another joint 30 and a speed that meets a certain threshold may be necessary to differentiate between good and bad braking performance. The speed at the slower joint 30 may not be enough to be able to evaluate the performance of the braking system 18 at the joint 30 while the speed at the faster joint 30 is enough to evaluate the performance of the braking system 18 at the joint 30. In this case, the performance data 70 for the slower joint 30 is not updated while the performance data 70 for the faster joint 30 is updated.

For systems where dynamic braking is only effective at high velocity, this data is logged and categorized by velocity. Performance at higher velocity is attributed to the dynamic braking subsystem 122/16 and performance at lower velocity is attributed to both braking subsystems. Low speed performance provides adequate evaluation of both braking subsystems and can be periodically performed without noticeably reducing the service life of the braking system 18. Methods performed during high speed operation typically wear and degrade the braking system 18 by a greater amount than methods performed at low speed operation.

The monitoring system 120 also logs the number of e-stops and the severity of each e-stop in the memory 134. E-stop severity levels range from low (braking system 18 actuated at zero speed) to high (braking system 18 actuated at high speed and max load). This e-stop data is compiled and analyzed over time to track the e-stop toll on each joint 30, estimate remaining performance life of brakes 50, and evaluate failures of the braking system 18 over the service life of the robot 10 and/or a statistical population or fleet of robots 10 used in similar applications as part of a larger process system.

E-Stop Method and Breakaway Method

Exemplary methods for evaluating the performance of the braking system 18 are now described. For purposes of teaching, the testing methods 200, 300 are described for a single joint 30.

E-Stop Method

An emergency stop (e-stop) interrupts normal operation of the robot 10. Referring to FIGS. 3 and 4, the e-stop method 200 is applied by the control system 122 and monitoring system 120 according to instructions stored in the memory 134. At an initiation step 210, an emergency stop (e-stop) is automatically or manually initiated. The control system 122 discontinues operation of the servo system 16 and causes the braking subsystems 18 to engage the joints 30. According to a collection step 212, throughout the e-stop, performance data 70 is collected by the sensors 140 of the monitoring system 120. The illustrated performance data 70 includes rotation position 70a, rotational velocity 70b, and rotational acceleration 70c at joint 30.

At the collection step 212, the performance data 70 is evaluated for its suitability for use because some e-stops occur at zero speed and no relevant stopping time or distance information is collected. Under zero speed conditions, the position holding capability of the robot of each joint 30 is evaluated. During this time, the observed position of each joint 30 is checked against a minimum drift limit. If the position exceeds the limit, the robot 10 is put into a mode allowing for further intervention and evaluation such as with the breakaway method 300. Otherwise, maintenance is performed.

Also, at the collection step 212, the control system 122 determines if the e-stop was the result of a physical collision. A collision can also make the performance data 70 unsuitable for use. Under this condition, the braking performance is not evaluated since the stopping performance would be a function of the conditions of the collision.

According to an identification step 214, the monitoring system 120 identifies performance parameters 72 in the performance data 70. In FIG. 4, the performance parameters 72 are resting position 72a, stopping time 72b, and engagement time 72c. The resting position 72a is the rotational position θ of the joint 30 when the joint 30 comes to rest (stopping time 72b). The illustrated stopping time 72b is determined where the rotational velocity θ' is substantially zero after e-stop command time 100. The engagement time 72c is the time between the e-stop command time 100 and a deceleration time 102. The deceleration time 102 is determined by the slope or magnitude of the acceleration θ" of the joint 30 and represents the initial effect of the engagement of the braking system 18.

According to a performance region step 216, the limits 90, 92 that define performance regions 80, 82, 84 are determined as described above. The limits 90, 92 associated with the engagement time 72c can be fixed relative to the e-stop command time 100 for all robot 10 motions.

According to an evaluation step 218, the monitoring system 120 determines the performance region 80, 82, 84 in which the performance parameters 72 fall or otherwise if the performance parameter 72 exceeds the limits 90, 92. The evaluation step 218 includes issuing an alert if the performance parameter 72 falls in the warning region 82 and executing instructions to fail to safe if the performance parameter 72 falls in the fail region 84. In FIG. 4, resting position 72a falls in the warning region 82, the stopping time 72b falls in the warning region 82, and the engagement time 72c falls in the good region 80. According to a logging step 220, performance data 70 is logged in the memory 134 for future analysis as described above.

Breakaway Method

The breakaway method 300 evaluates the frictional capabilities or stick-slip of the brakes 50 during downtime for the robot 10. The breakaway method 300 is automated and implemented by the control system 122 according to instructions stored in the memory 134. Referring to FIGS. 5 and 6, according to a brake application step 310, the control system 122 applies the brake 50 while the servomotor 40 is at zero speed. According to a torque application step 312, the control system 122 commands the servomotor 40 to apply increasing torque T until breakaway torque 72d is reached such that the servomotor 40 torque overcomes the frictional force of the brake 50 (breakaway). According to a stopping step 314, after breakaway, the control system 122 discontinues the torque command to the servomotor 40 and continues to apply the brake 50 to bring the motion of the joint 30 to a stop.

According to a collecting step 316 that runs in parallel with the steps 312, 314, performance data 70 is collected by the sensors 140 of the monitoring system 120. In FIG. 6, the performance data 70 includes rotational velocity 70b and torque 70d. According to an identification step 318, performance parameters 72 are identified in the performance data 70 by the monitoring system 120. In FIG. 6, the performance parameters 72 are stopping time 72b and breakaway torque 72d.

According to a performance region step 320, the monitoring system 120 determines the limits 90, 92 and performance regions 80, 82, 84 as described above. According to an evaluation step 322, the monitoring system 120 determines the performance regions 80, 82, 84 in which the performance parameters 72 fall. The evaluation step 322 includes issuing an alert if the performance parameter 72 falls in the warning region 82 and executing instructions to fail to safe if the performance parameter 72 falls in the fail region 84. In FIG. 6, the stopping time 72b falls in the warning region 82, and the breakaway torque 72d falls in the good region 80. According to a logging step 324, performance data 70 is logged in the memory 134 for future analysis as described above.

The breakaway method 300 can be initiated manually or automatically at a predetermined interval if an e-stop method 200 has not recently successfully evaluated the performance of the braking system 18 or parts of the braking system 18. A maximum time between evaluations can be set according to process and local requirements. Once one or more joints 30 reach the maximum time between evaluations, automated evaluations are scheduled to run at the next opportunity as established by system programming and setup. For example, automated evaluation breakaway method 300 runs when the robot 10 is idle and has ample time to complete the evaluation before it resumes production operation.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system for evaluating performance of a braking system for a joint of a robot during an emergency stop, comprising:
   a processor; and
   a memory comprising computer executable instructions that, when executed by the processor, cause the processor to perform operations comprising:
      accessing an expected value of a performance parameter, wherein the expected value of the performance parameter is a value that is expected after a brake is applied during an emergency stop event, wherein the expected value is a function of dynamics of the robot and a frictional capability of the brake;
      accessing a first limit and a second limit, wherein each of the first limit and the second limit is calculated as a function of the expected value of the performance parameter, the second limit being further from the expected value of the performance parameter than the first limit;
      identifying an actual value of the performance parameter using a set of performance data, wherein the performance data is measured with a sensor at the joint of the robot; and
      determining whether the actual value of the performance parameter is below the first limit, between the first limit and the second limit, or above the second limit.

2. The system of claim 1, wherein the performance data includes position and the performance parameter includes resting position.

3. The system of claim 1, wherein the expected value of the performance parameter is calculated using a dynamic model of the robot.

4. The system of claim 1, wherein the expected value of the performance parameter is calculated as a function of experimental measurements of the performance parameter.

5. The system of claim 1, wherein the operations further comprise issuing, in response to the actual value of the performance parameter being between the first limit and the second limit, an alert.

6. The system of claim 5, wherein the operations further comprise controlling, in response to the actual value of the performance parameter exceeding the second limit, the robot to fail to safe.

7. A system for determining the performance of a braking system for a joint of a robot, comprising:

a processor; and a memory comprising computer executable instructions that, when executed by the processor, cause the processor to perform operations comprising:

applying simultaneously a brake to the joint and increasing a torque to the joint until the torque overcomes a force being applied by the brake;

measuring a set of performance data with a sensor at the joint of the robot;

identifying an actual value of a performance parameter using the set of performance data;

accessing an expected value of the performance parameter, wherein the expected value of the performance parameter is a value that is expected at or after the torque overcomes the force being applied by the brake, wherein the expected value of the performance parameter is a function of a frictional capability of the brake;

accessing a first limit and a second limit, wherein each of the first limit and the second limit is calculated as a function of the expected value of the performance parameter, the second limit being further from the expected value of the performance parameter than the first limit; and determining whether the actual value of the performance parameter is below the first limit, between the first limit and the second limit, or above the second limit.

8. The system of claim 7, wherein the performance data includes velocity and the performance parameter includes stopping time.

9. The system of claim 7, wherein the performance data includes torque and the performance parameter includes breakaway torque.

10. The system of claim 7, wherein the expected value is calculated as a function of a dynamic model of the robot.

11. The system of claim 7, wherein the expected value of the performance parameter is calculated as a function of experimental measurements of the performance parameter.

12. The system of claim 7, wherein the operations further comprise issuing, in response to the actual value of the performance parameter being between the first limit and the second limit, an alert.

13. The system of claim 12, wherein the operations further comprise controlling, in response to the actual value of the performance parameter exceeding the second limit, the robot to fail to safe.

14. A robot, comprising:
an arm comprising a joint;
a braking system configured to apply a brake at the joint;
a servo system configured to apply a torque at the joint;
a sensor configured to measure performance data at the joint; and
a system for determining the performance of the braking system, comprising:
a processor; and
a memory comprising computer executable instructions that, when executed by the processor, cause the processor to perform operations comprising:

accessing an expected value of a performance parameter, wherein the expected value of the performance parameter is a value that is expected after the brake is applied during an emergency stop event, wherein the expected value of the performance parameter is a function of dynamics of the robot and a frictional capability of the brake, accessing a first limit and a second limit, wherein each of the first limit and the second limit is calculated as a function of the expected value of the performance parameter, the second limit being further from the expected value than the first limit;

identifying an actual value of the performance parameter from performance data measured by the sensor; and determining whether the actual value of the performance parameter is below the first limit, between the first limit and the second limit, or above the second limit.

15. The system of claim 1, wherein the performance data includes velocity and the performance parameter includes stopping time.

16. The system of claim 1, wherein the performance data includes acceleration and the performance parameter includes engagement time.

17. The system of claim 1, wherein the first limit is the expected value of the performance paramenter plus a first error and the second limit is the expected value of the performance parameter plus a second error.

18. The system of claim 7, wherein the first limit is the expected value of the performance parameter plus a first error and the second limit is the expected value of the performance parameter plus a second error.

* * * * *